United States Patent [19]

Rastegar

[11] Patent Number: 4,694,276
[45] Date of Patent: Sep. 15, 1987

[54] INTERFEROMETRIC ANALOG-TO-DIGITAL CONVERTER AND METHOD FOR OPERATION

[75] Inventor: Ali Rastegar, Wellesley, Mass.

[73] Assignee: Analog Devices, Inc., Wilmington, Mass.

[21] Appl. No.: 896,652

[22] Filed: Aug. 13, 1986

[51] Int. Cl.[4] .............................................. H03M 1/00
[52] U.S. Cl. ......................... 340/347 AD; 350/96.14; 356/349
[58] Field of Search ............. 340/347 AD; 350/96.14, 350/96.13; 372/28; 356/345, 349; 455/608, 610

[56] References Cited

U.S. PATENT DOCUMENTS

| | | | |
|---|---|---|---|
| 4,325,603 | 4/1982 | Marom | 340/347 AD |
| 4,515,430 | 5/1985 | Johnson | 356/345 |
| 4,571,576 | 2/1986 | Olsson | 340/347 AD |

*Primary Examiner*—Charles D. Miller
*Attorney, Agent, or Firm*—Wolf, Greenfield & Sacks

[57] ABSTRACT

A guided-wave electrooptic analog-to-digital converter utilizes a multiple wavelength optical source as a sampling source to minimize the number of interferometers needed for conversion of an analog signal with a given resolution. A reduction in the number of interferometers reduces the capacitive impedance of the analog signal input and facilitates driving the converter with conventional R.F. amplifiers. The multiple-wavelength signal consists of a combination of a plurality of signals with wavelengths which are substantially binary multiples of the shortest wavelength. The signals are passed together through a conventional Mach-Zehnder interferometric modulator and the interferometer output is split back into a plurality of output beams each with a single wavelength. Each of the output beams represents a bit of the digitized signal. By increasing the number of different wavelengths in the sampling signal, higher resolutions in the output signal can be obtained with a single interferometric modulator.

26 Claims, 5 Drawing Figures

INTERFEROMETRIC ANALOG-TO-DIGITAL CONVERTER AND METHOD FOR OPERATION

FIELD OF THE INVENTION

This invention relates to electrooptical analog-to-digital converters which use a parallel array of interferometric modulators to convert an analog signal.

BACKGROUND OF THE INVENTION

Analog-to-digital converters are commonly used in a variety of applications including computer-controlled manufacturing systems, communication systems and signaling systems. In these systems, the analog-to-digital converter samples voltages which are produced by transducers that measure analog phenomena occurring in the environment. The analog-to-digital converter converts the magnitude of the voltage into digital signals that can be conveniently stored and processed in conventional digital computers.

It is well-known that the rate at which samples of an analog signal are taken must be at least twice the maximum frequency component of the analog signal in order to insure that the signal can be reproduced accurately. As the operating frequency of electronic processing circuitry becomes higher and higher, it has been desirable to greatly increase the sampling and conversion speed of analog-to-digital converters to provide digital data at a rate that will not limit the processing rate of the digital processing circuitry.

Several different technologies have been used in the prior art to fabricate high-speed analog-to-digital converters. For example, one such prior art technology is silicon bipolar circuits. Converters using silicon bipolar technology generally consist of a track-and-hold circuit followed by a parallel bank of comparators. The outputs of the comparators are combined by logic circuits to generate the final digital output. Sampling rates of 400 million samples per second have been built utilizing this technology, but the distribution of analog signals to the comparators involves serious signal interference and capacitance loading problems. In addition, the large number of comparators which must be placed in a small area also presents heat dissipation problems that practically limit the resolution of the ultimate system to a small number of output bits.

Accordingly, other prior-art analog-to-digital converters have been made using gallium-arsenide (GaAs) technology. Due to the physical characteristics of gallium arsenide, GaAs circuits have an intrinsically higher speed than silicon bipolar circuits. Accordingly, in theory, the conversion speed can be significantly improved utilizing this alternate technology. However, at present, GaAs circuits are limited in performance due to unstable transistor operating characteristics.

Other prior art converters have utilized Josephson-junction superconducting quantum interference devices (SQUIDs). The switching characteristics in these devices are a periodic function of the magnitude of the input analog signal and thus the devices can be used as a basic element of an analog-to-digital converter. In such a converter, the analog signal to be converted is applied simultaneously to an array of SQUID devices connected in parallel.

SQUID devices have the advantage that they are small and capable of operating at fairly high speeds. Unfortunately, due their operating characteristics, SQUID switching thresholds are established by the peak amplitude of the clock pulses which drive the devices. Thus, during converter operation, the clock pulse must be held constant from cycle to cycle to prevent quantization error. Stable clocks are difficult to design at the speeds required.

In addition, SQUID devices require that the analog signal not vary during the conversion process to prevent erroneous switching. Accordingly, the converter must incorporate fast, accurate sampling or be preceded by very fast track-and-hold circuit. Both of the latter functions are difficult to design at the high operational speeds necessary.

Parallel SQUID converters also encounter problems with digital crosstalk into the analog system and instability of quantization thresholds. The first problem requires careful design of chip mounting and the second problem requires that the converter be equipped with automatic recalibration systems thereby increasing the cost of the system and its complexity.

Consequently, to increase conversion speeds, a variety of electrooptic techniques have been tried, including multi-interferometer electrooptic converters utilizing either Taylor or Mach-Zehnder interferometers. In constructing analog-to-digital converters, optical interferometers have been used as a modulator with a sampling input, an input for the analog signal to be converted and an output for the modulated signal. The analog input is applied to electrodes in the device which alter the magnitude of the signal at the output.

A common pulsed optical signal generated from a pulsed laser is applied in parallel to a plurality of interferometric modulators. Generally, a separate interferometric modulator is used for each bit of the digital output signal. The modulator outputs are sensed by photodiodes and compared to a reference signal obtained from the common laser source to generate a digital output signal.

A prior art electrooptical converter of this type using a Mach-Zehnder interferometer is described in detail in an article entitled "Wide Band Electrooptic Guided-Wave Analog-To-Digital Converters", by R. A. Becker, Charles E. Woodward, F. J. Leonberger, and Richard C. Williamson, *Proceedings of the IEEE*, Volume 72, No. 7, July 1984, which is hereby incorporated by reference.

While the above-described electrooptical converters operate satisfactorily and can sample at a one gigasample per second rate with two-bit and four-bit resolution, they suffer from two problems. One problem is that high-resolution systems with a large number of output bits require a large number of optical modulators connected in parallel. Each optical modulator must be connected in parallel to the analog voltage source and it has been found that the capacitance of all of the converter electrodes connected in parallel makes it extremely difficult to drive a large modulator array with conventional RF amplifiers at reasonable operating speeds. Thus, it appears that the parallel electrooptical converter arrangement is limited by practical RF amplifier considerations to low-resolution systems.

Accordingly, it is an object of the present invention to provide a simplified electrooptical analog-to-digital converter.

It is another object of the present invention to provide an electrooptic analog-to-digital converter which does not require an electrooptic interferometer for each bit of resolution.

It is still another object of the present invention to provide an electrooptic analog-to-digital converter which is capable of high-speed operation.

It is yet a further object of the present invention to provide an electrooptic analog-to-digital converter which does not suffer from high analog input capacitance due to multiple parallel electrodes.

It is still another object of the present invention to provide an electrooptic analog-to-digital converter which can be constructed using conventional interferometric technology.

It is a further object of the present invention to provide an electrooptical analog-to-digital converter which produces outputs that are compatible with conventional digital circuitry.

SUMMARY OF THE INVENTION

The foregoing objects are achieved and the foregoing problems are solved in one illustrative embodiment of the invention in which a multi-bit analog-to-digital converter is constructed with one or more optical interferometers by passing multiple wavelength signals through each interferometer thereby allowing use of each interferometer for more than one digital output bit.

The multiple-wavelength signal consists of a combination of a plurality of signals with wavelengths which are substantially integer multiples of the shortest wavelength. For operation with binary circuitry, the integer multiples are conveniently chosen as binary multiples of the shortest wavelength. The sources which generate the multiple wavelength signals are pulsed to provide for a sampling function.

The pulsed, multiple wavelength signals are passed together through a conventional interferometric modulator in which the output is a periodic function with a period that depends, among other factors, on the wavelength of the sampling signal and the magnitude of the analog signal to be converted.

At the interferometer output, the modulated, multiple-wavelength beam is split back into a plurality of output beams each with a single wavelength. Because the of the periodic dependance of the interferometer output on the wavelength, the single wavelength beams carry information which represents different bits of a digital signal even though each wavelength signal is modulated by the same analog signal voltages applied by the same modulator electrodes. By increasing the number of different wavelengths in the sampling signal, higher resolutions in the output signal can be obtained with a single interferometric modulator or a small number of interferometric modulators connected in parallel. The small number of interferometers reduces the load impedance seen by the RF amplifier which drives the interferometers and thus simplifies amplifier design.

DETAILED DESCRIPTION OF THE PREFERRED EMBODIMENTS

Figure 1:
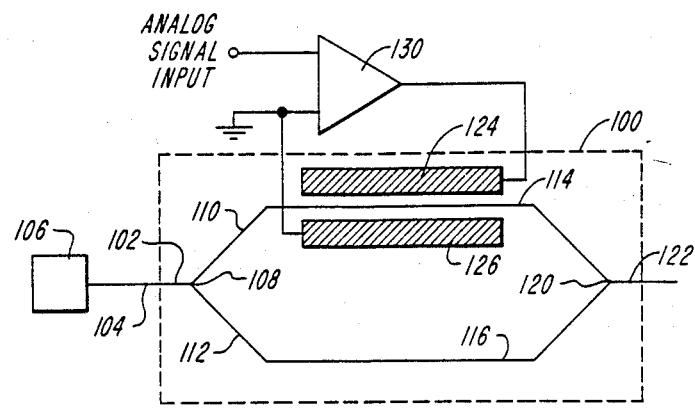
FIG. 1 of the drawing is a schematic diagram of a conventional planar waveguide version of a Mach-Zehnder interferometer.

FIG. 1 is an electrical and mechanical schematic of a conventional prior-art planar-waveguide version of a Mach-Zehnder interferometer which is the fundamental integrated optical component of one type of conventional analog-to-digital converter (ADC). The Mach-Zehnder interferometer consists of an electrooptic crystal 100 which has a conventional single-mode optical waveguide 102 at the sampling input 104. The optical output from a pulsed sampling laser 106 is applied to the sampling input 104. Inside the crystal, the waveguide 102 branches at a Y-junction 108 to split the optical power into two equal components, 110 and 112. The two components 110 and 112 are directed down parallel waveguide paths, 114 and 116. Each component of the optical power travels an equal distance down the parallel paths and the components are then recombined at a second Y-junction 120 and exit the crystal 100 in a final single-mode waveguide 122.

In the absence of any external influences along the parallel paths, 114 and 116, the optical power components recombine in phase at the second Y-junction 120 to form a optical beam with the lowest order mode which is supported by the output waveguide yielding a maximum output. However, in the optical crystal used to construct the interferometer, (for example, lithium niobate, $LiNbO_3$) the phase velocity of optical energy traveling in a waveguide is sensitive to external voltages applied across the waveguide. More particularly, if a voltage is applied across the waveguide in one of the parallel arms of the interferometer (for example across waveguide 114 by means of electrodes 124 and 126 driven by amplifier 130), the phase velocity of light propagating in that arm is altered due to a well-known linear electrooptic effect.

The phase difference caused by the application of electrical voltages across electrodes 124 and 126 affects the recombination of light in the two interferometer arms, 114 and 116, which changes the magnitude of the output signal. More particularly, if the applied voltage is such that the two optical power components are pi radians out of phase, the two components, upon recombining at Y-junction 120, form a combined output which has a second-order oscillating mode. The single mode output waveguide 122 cannot support such a mode and the combined power radiates out of the waveguide 122 and into the crystal substrate 100. Thus, no optical power propagates down the output waveguide 122.

In general, the output of the modulator (for a constant intensity input) varies as the cosine squared of a term that depends on the product of the length of the electrodes along the waveguide path and the voltage applied to the electrodes. More particularly, the formula for the output intensity is:

$$I_{out} = I_{in} \cos^2(\psi/2 + \psi_s/2) \tag{1}$$

where $I_{out}$ is the output intensity, $I_{in}$ is the input intensity, $\psi$ is the net phase difference due to the applied voltage and $\psi_s$ is a static phase difference caused by crystal imperfections and slight differences in the two parallel converter arms.

In general the voltage-induced phase difference $\psi$ is related to the length of the waveguide by the following equation:

$$\psi = 2\pi L \, dn/\lambda \tag{2}$$

where L is the length of the waveguide, dN is the refractive index change due to the applied voltage and $\lambda$ is the wavelength of the optical power propagating through the guide.

Figure 2:
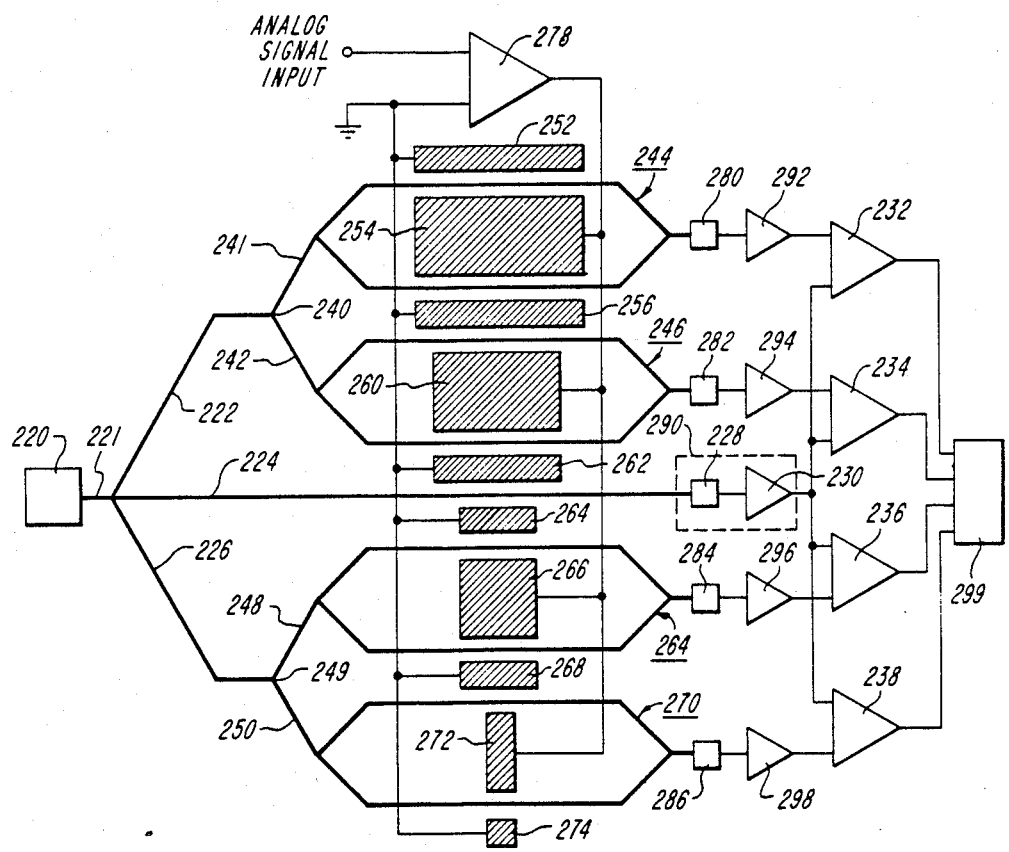
FIG. 2 is a schematic diagram of a prior art electrooptic analog-to-digital converter using a Mach-Zehnder interferometric modulator.

FIG. 2 shows a conventional four-bit ADC which uses four interferometric modulators, 244, 246, 264 and 270. A pulsed laser 220 provides the input optical power to the parallel interferometers. Laser 220 may conventionally be a laser diode driven by a comb generator to generate a plurality of very short (approx. 120 picoseconds) pulses. The output pulses from laser 220 are fed into single mode input waveguide 221 which divides the power equally into three waveguides 222, 224, and 226.

The optical power in waveguide 224 serves as a reference signal and is provided to a reference circuit 290 which comprises a photodiode detector 228 and reference amplifier 230. As will be hereinafter described, the output of the reference circuit 290 is provided to comparators 232-238 to generate the digital output.

Optical power is fed through waveguide 222 to Y-junction 240 which divides the power into two equal components which propagate down guides 241 and 242. Waveguide element 241 serves as the input to the LSB (least significant bit) interferometer 244. The output from waveguide 242 is fed into the NLSB (next least significant bit) interferometer 246.

Similarly, optical power propagating down waveguide 226 branches at Y-junction 249 into waveguides 248 and 250 to the NMSB (next most significant bit) and MSB interferometers 264 and 270.

In accordance with prior-art practice, differentiation among the output bits is obtained by varying the length of the electrodes in each interferometer. More specifically, LSB interferometer 244 contains three electrodes, 252, 254, and 256 which are connected in a differential arrangement to double the phase change caused by a given analog input voltage. NLSB interferometer 246 also contains two additional electrodes 260 and 262 connected in a differential arrangement with electrode 256, however these latter electrodes have a length which is one-half the length of electrodes 252, 254 and 256.

The NMSB interferometer 264 has three electrodes 264, 266 and 268, all of which have a length which is one-quarter the length of electrodes 252, 254 and 256. Similarly, the MSB interferometer 270 has two additional electrodes 272 and 274, all of which have a length which is ⅛ the length of electrodes 252, 254 and 256. Since the length of the electrodes for all four interferometers are in a binary relationship and the output of each interferometer is dependent on the length of the electrodes, the output signals developed by the interferometers will also be in a binary relationship.

The electrodes of the interferometers are connected in parallel to the output of analog RF amplifier 278 which drives the interferometers with the magnitude of the analog signal to be converted. During each laser pulse the analog voltage magnitude is sampled by each interferometer which modulates the signal according to its electrode length to generate a modulated analog signal.

The modulated analog signals at the outputs of interferometers 244, 246, 264 and 270 are each provided to photodiode detectors 280, 282, 284 and 286, respectively which detectors convert the optical signal to an electrical signal. The outputs of the detectors 280-286 are provided as inputs to RF amplifiers 292-298. The outputs of amplifiers 292-298 are, in turn, provided to comparators 232-238.

In comparators 232-238, the analog outputs of amplifiers 292-298 are converted into digital signals by comparing the output of each of amplifiers 292-298 to the output of reference amplifier 230. The digital signals may be further processed by conventional decoding circuitry 299 to generate the final digital output four-bit word.

As previously discussed, a serious problem with such a conventional converter is that a separate interferometer must be used for each bit of resolution at the output. Since each interferometer has three modulating electrodes, the connection of parallel interferometers requires that the modulating electrodes be connected in parallel to the analog source. While it is possible to locate the interferometers physically adjacent, thereby using a common electrode and eliminating one extra electrode, it is still necessary to utilize a significant number of parallel-connected electrodes in a practical arrangement. For example, the four-bit converter shown in FIG. 2 requires RF amplifier 278 to drive ten electrodes connected in parallel. Since the impedance of the electrodes is capacitive in nature, the parallel connection causes the impedances to add (although, due to the decreasing size of the electrodes, the capacitance is not ten times the capacitance of a single electrode), presenting a difficult load for amplifier 278 to drive.

Figure 3:
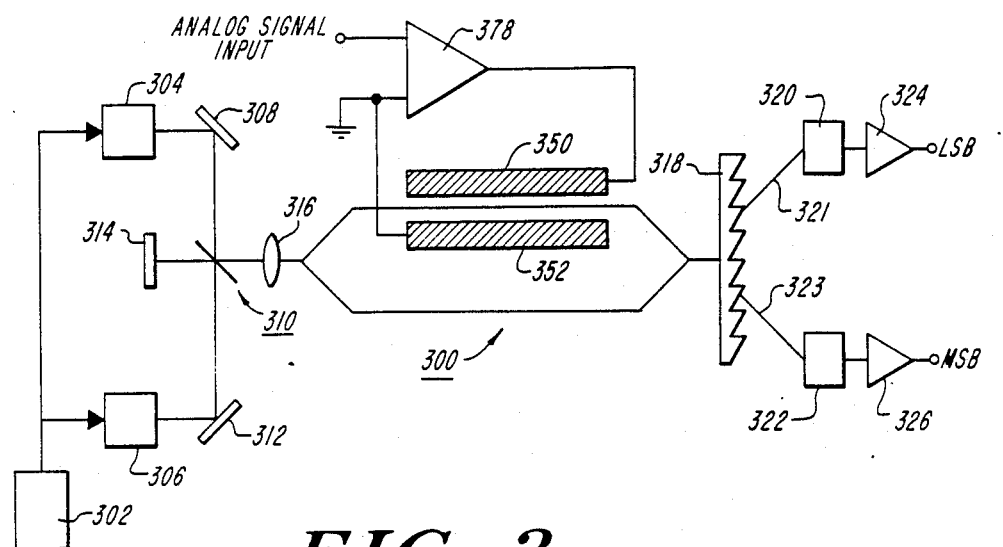
FIG. 3 is a schematic diagram of an analog-to-digital converter with a two-bit resolution constructed in accordance with the principles of the invention.

FIG. 3 shows an illustrative two-bit electrooptical analog-to-digital converter constructed in accordance with the principles of the invention. As with the conventional electrooptic ADC described above, the main component is a Mach-Zehnder interferometric modulator 300 which is constructed in accordance with conventional designs. However, the inventive converter has an important difference from the aforementioned prior art converter. This difference can be shown by considering equation (2) above. Equation (2) indicates that the period of the cosine-squared function is inversely proportional to the wavelength of the optical power passing through the guide. Thus, a converter can be designed by using a single interferometer with multiple wavelength optical power rather than using single wavelength optical power and multiple interferometers with differing electrode length as in the prior art.

Accordingly, the inventive interferometer is driven by two laser sources 304 and 306 which may be any conventional laser source such as an excimer laser or a solid state diode laser. A solid state diode laser is preferred because it would allow integration of the laser sources with the interferometer unit. Lasers 304 and 306 are selected such that the output wavelength ($\lambda$) of laser 304 is twice the output wavelength of laser 306 (which has an output wavelength of $\lambda/2$).

Laser sources 304 and 306 are commonly driven by comb generator 302. Generator 302 is a conventional device which generates a plurality of short (approx. 100 picoseconds) pulses at high repetition rates by means of a device such as a step recovery diode. Generator 302 is used to drive lasers 304 and 306 to produce a plurality of short-width pulses at high repetition rates.

The output of laser 304 is reflected by mirror 308 to combining optics 310. Similarly, the output of laser 306 is reflected by mirror 312 to optics 310. Beam combining optics 310 are conventional and consist of a semi-transparent mirror 310 and reflecting mirror 314. These optics combine the two laser beams into a single multiple wavelength input beam which is focused by lens 316 onto the input waveguide of interferometer 300.

After passing through interferometer 300, the modulated multiple frequency output beam is split into two single-frequency output beams 321 and 323 by a conventional optical prism or grating 318 which directs the single wavelength beams separately to photodetectors 320 and 322. The shorter wavelength ($\lambda/2$) beam contains the least significant bit output information and the longer wavelength beam ($\lambda$) contains the most significant output bit information. As with the conventional converter circuitry, photodetectors 320 and 322 convert the modulated analog signals into electrical signals.

The electrical signal outputs of the photodetectors are provided to limiters 324 and 326, respectively, to produce the two-bit digital output.

A comparison of FIGS. 2 and 3 shows that only two electrodes 350, 352 are required in the inventive analog-to-digital converter whereas at least five electrodes would be required in the prior art electrooptic converter. Thus, the capacitance of the electrode array is significantly reduced in the inventive design, thereby reducing the driving requirements on the RF amplifier 378 which drives the electrodes.

Figure 4:
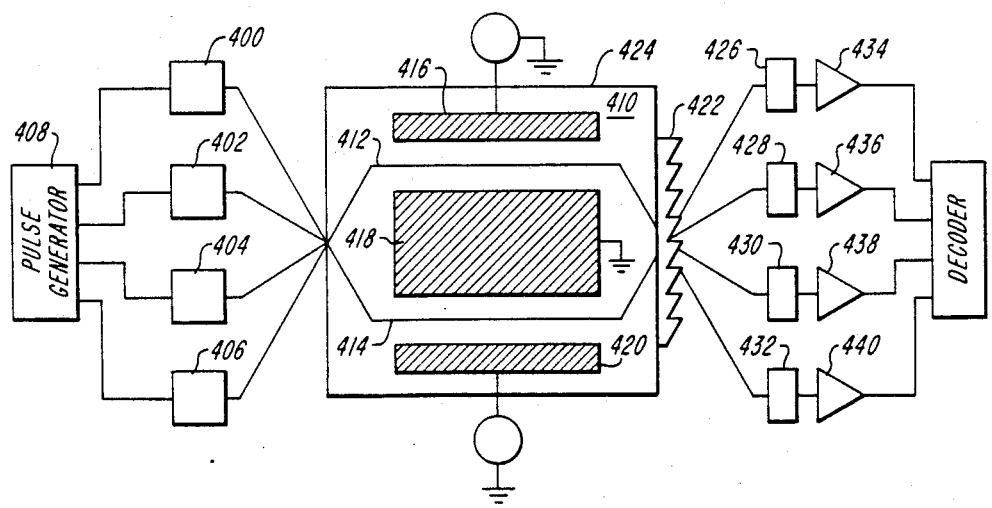
FIG. 4 is a schematic diagram of a analog-to-digital converter with a four-bit resolution constructed in accordance with the principles of the invention.

FIG. 4 shows an illustrative embodiment in which a single interferometric modulator is used to process optical signals from four separate optical sources in order to implement an analog-to-digital converter with a four-bit resolution. In FIG. 4 four laser sources 400, 402, 404 and 406 operating with wavelengths of $\lambda$, $\lambda2$, $\lambda/4$, and $\lambda/8$ are driven by a pulse generator such as the comb generator 408 to produce four optical output beams. These beams are combined to form a multiple wavelength input beam with conventional beam combining circuitry (not shown in FIG. 4 but similar to that shown in FIG. 3) and provided to interferometric modulator 410.

Modulator 410 has conventional construction and comprises optical waveguides 412 and 414 and electrodes 416, 418 and 420. Three electrodes are used to allow a differential drive. After passing through the modulator, the modulated multiple wavelength beam is separated into four single wavelength output beams by a prism or grating 422 which may illustratively be fabricated in a known manner from the integrated substrate 424 which comprises the interferometric modulator.

The four output beams are provided to four photodetectors 426–432 and the outputs of the photodetectors are, in turn, provided to four comparators 434–440 to generate the final output digital signals. As shown in FIG. 4, only three electrodes are needed for a four-bit analog-to-digital converter using the inventive construction in comparison to the ten electrodes which are necessary with the conventional construction shown in FIG. 2.

Figure 5:
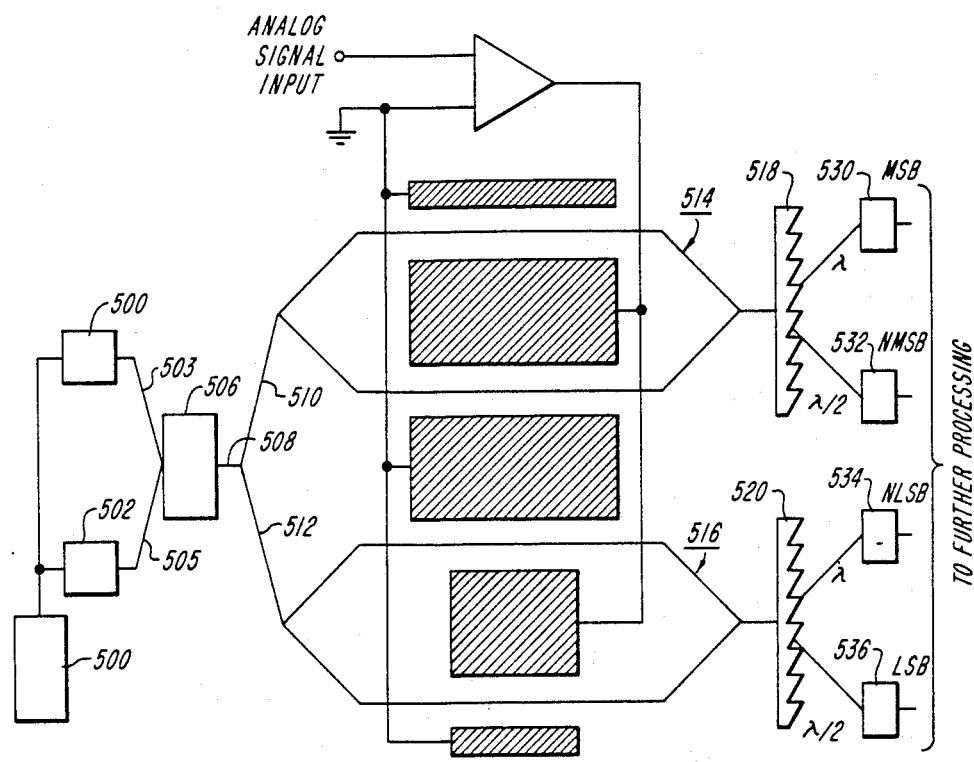
FIG. 5 is a schematic diagram of an alternative embodiment of a analog-to-digital converter with a four-bit resolution constructed in accordance with the principles of the invention.

FIG. 5 shows an alternative embodiment of a four-bit electrical converter in which two interferometric modulators are used. Each modulator is driven by a two-wavelength composite optical beam. This alternative embodiment reduces the complexity of the optical components which are necessary to combine the four separate beams.

As shown in FIG. 5, two optical sources 500 and 502 driven by a common pulse generator 500. As discussed above, sources 500 and 502 are arranged to have wavelengths which differ by a factor of two. The output beams 503, 505 of sources 502 and 504, respectively, are combined into a multiple wavelength input beam 508 by conventional combining optics 506.

Multiple wavelength input beam 508 is split into two equal components 510 and 512 by an optical Y-junction and components 510 and 512 are provided to two separate interferometric modulators 514 and 516. Modulator 514 is designed with an electrode length which is twice the electrode length of modulator 516.

The modulated multiple wavelength output beams generated by each modulator are each split into two separate single frequency beams by prisms or gratings 518 and 520 for a total of four single-frequency output beams. Each output beam is directed to a separate photodetectors 530–536. As with the embodiments previously discussed, the analog electrical outputs from detectors 530–536 are provided to comparators and logic circuitry (not shown) to develop the final digital output word.

Referring to equation (2) above, since the period of the cosine-squared function developed by the interferometers is proportional to the length of the electrodes and inversely proportional to the input wavelength, the most significant bit signal will be developed over the optical path which has the shortest electrode length and the longest wavelength ($\lambda$). Similarly the least significant bit will be developed by the optical path carrying the shortest wavelength light and which passes through the waveguide with the longest electrodes. The remaining digital bits are formed by the intermediate combinations as shown on FIG. 5.

This illustrative embodiment uses only five electrodes connected in parallel as compared to ten electrodes required in the conventional design shown in FIG. 2.

Although only a few illustrative embodiments have been disclosed herein other obvious modifications and changes will be immediately apparent to those skilled in the art, which modifications and changes are within the spirit and scope of the invention as disclosed and claimed herein.

What is claimed is:
1. An electrooptic analog-to-digital converter for converting an analog signal to a digital representation comprising:
   an optical source for producing a pulsed multiple wavelength sampling beam, wherein the wavelengths are integer multiples of each other,
   modulating means responsive to said multiple wavelength optical beam and to said analog signal for generating a multiple wavelength output beam which is a periodic function with a period that is dependent on the sampling beam wavelength and the magnitude of said analog voltage to be converted, and
   means responsive to each individual wavelength in said output beam for generating a digital signal representing a single digital bit in a digital representation of said analog signal.
2. An electrooptic analog-to-digital converter according to claim 1 wherein said periodic function is a cosine-squared function.

3. An electrooptic analog-to-digital converter according to claim 1 wherein said modulating means is an interferometer.

4. An electrooptic analog-to-digital interferometer according to claim 1 wherein said interferometer is a Mach-Zehnder interferometer.

5. An electrooptic analog-to-digital interferometer according to claim 1 wherein said multiple wavelengths are binary multiples of the shortest wavelength.

6. An electrooptic analog-to-digital converter comprising:
an optical source for producing a pulsed multiple wavelength sampling beam, wherein the wavelengths are integer multiples of each other,
an interferometer, including a sampling input for receiving said beam, an analog input for receiving an analog signal to be converted and an output for producing a modulated, multiple wavelength output beam, wherein said output beam is a periodic function with a period which depends on the magnitude of said analog signal and the wavelength of the optical power provided to said sampling input,
means for splitting said output beam into a plurality of single wavelength beams, and
means for converting each of said single wavelength beams into a digital signal representing a single digital bit corresponding to said analog input.

7. An electrooptic analog-to-digital converter according to claim 6 wherein said interferometer is a Mach-Zehnder interferometer.

8. An electrooptic analog-to-digital converter according to claim 6 wherein said optical source comprises a plurality of single wavelength optical sources, means for pulsing said optical sources at a sampling frequency to produce a plurality of pulsed, single wavelength optical beams, and means for optically combining said plurality of optical beams to generate a single multiple wavelength optical beam.

9. An electrooptic analog-to-digital converter according to claim 8 wherein said single wavelength optical sources comprise laser diodes.

10. An electrooptic analog-to-digital converter according to claim 6 wherein said pulsed, multiple wavelength beam is comprised of wavelengths which are binary multiples of the shortest wavelength.

11. An electrooptic analog-to-digital converter according to claim 6 wherein said splitting means comprises an optical prism.

12. An electrooptic analog-to-digital converter according to claim 6 wherein said splitting means comprises an optical grating.

13. An electrooptic analog-to-digital converter according to claim 6 wherein said converting means comprises a plurality of photodetectors, each of said plurality of photodetectors responsive to one of said plurality of single wavelength beams for generating a modulated analog signal, means for generating a reference signal, and a plurality of comparators, each of said comparators being responsive to said reference signal and to one of said modulated analog signals for generating a digital signal representing one bit of the total digital output signal.

14. An electrooptic analog-to-digital converter according to claim 13 wherein said reference signal is generated from said pulsed multiple wavelength beam.

15. An electrooptic analog-to-digital converter comprising:
a first optical source and a second optical source, each of said sources generating optical output beams, said second source generating an optical beam at a wavelength which is twice the wavelength of the optical beam generated by said first source,
means for pulsing said sources to generate pulsed output beams,
means for combining the optical beams generated by said first and second sources to produce a multiple wavelength beam,
a Mach-Zehnder interferometer, including a sampling input for receiving said multiple wavelength beam, an analog input for receiving an analog input signal to be converted and an output for producing a modulated, multiple wavelength output beam,
means for splitting said output beam into a plurality of single wavelength beams,
a plurality of photodetectors, each of said detectors being responsive to one of said single wavelength beams for generating a modulated analog signal representative of the magnitude of said analog input signal,
means for generating a reference signal from said multiple wavelength beam, and
a plurality of comparators means responsive to said reference signal and said modulated analog signals for generating a digital signal representing a single digital bit corresponding to the magnitude of said analog input signal.

16. An electrooptic analog-to-digital converter according to claim 15 wherein said first and second optical sources comprise laser diodes.

17. An electrooptic analog-to-digital converter according to claim 16 wherein said pulsing means is a comb generator.

18. An electrooptic analog-to-digital converter according to claim 17 wherein said combining means comprises a half-silvered mirror.

19. An electrooptic analog-to-digital converter according to claim 18 wherein said splitting means comprises an optical prism.

20. An electrooptic analog-to-digital converter according to claim 18 wherein said splitting means comprises an optical grating.

21. An electrooptic analog-to-digital converter according to claim 18 further comprising logic circuitry responsive to said digital signals for generating a digital word consisting of a plurality of parallel digital bits.

22. A method for operating an electrooptic analog-to-digital converter comprising:
an optical source for producing a pulsed beam,
an interferometer, including a sampling input for receiving said beam, an analog input for receiving an analog signal to be converted and an output for producing a modulated, output beam, wherein said output beam is a periodic function with a period which depends on the magnitude of said analog signal and the input wavelength, and
means for converting said output beam into a digital signal representing a single digital bit, said method comprising the steps of:
A. combining the output beams of at least two optical sources to form a multiple wavelength input beam, said sources having output beams with wavelengths which are multiples of the shortest wavelength, B. passing said multiple wavelength input beam through said interferometer to form a modulated output beam, C. splitting said modulated output beam into a plurality of single wavelength output beams, and D. converting said single wavelength output beams into a plurality of digital bits.

23. A method according to claim 22 wherein step A comprises the steps of:

A1. pulsing the sources from a common single pulse source,

A2. combining the source output beams with optical beam combining apparatus, and A3. focussing the combined beam onto said interferometer sampling input.

24. A method according to claim 22 wherein step C comprises the steps of:

C1. passing said modulated output beam through an optical prism.

25. A method according to claim 22 wherein step C comprises the steps of:

C2. passing said modulated output beam through an optical grating.

26. A method according to claim 22 wherein step D comprises the steps of:

D1. directing each of said single wavelength beams onto one of a plurality of photodetectors, D2. comparing the output of said photodetectors to a reference signal derived from said multiple wavelength input beam to generate a plurality of digital bit signals, and D3. logically combining said digital bit signals to generate a multi-bit digital output word.

* * * * *